(12) United States Patent
Chen

(10) Patent No.: US 6,782,882 B1
(45) Date of Patent: Aug. 31, 2004

(54) DRY AND WET CUTTING TILE SAW

(76) Inventor: Yuehting Chen, P.O. Box 697, Feng-Yuan, Taichung Hsien (TW), 420

( * ) Notice: Subject to any disclaimer, the term of this patent is extended or adjusted under 35 U.S.C. 154(b) by 126 days.

(21) Appl. No.: 10/291,581

(22) Filed: Nov. 12, 2002

(51) Int. Cl.[7] ............................. B28D 1/04; B28D 7/02
(52) U.S. Cl. ............................... 125/13.01; 125/13.03; 451/456
(58) Field of Search .................... 125/13.01, 13.03; 451/451, 454, 455, 456

(56) References Cited

U.S. PATENT DOCUMENTS

| | | | | |
|---|---|---|---|---|
| 1,669,941 A | * | 5/1928 | Kennedy | 83/473 |
| 2,455,113 A | * | 11/1948 | Clair | 125/13.03 |
| 5,676,124 A | * | 10/1997 | Lee | 125/13.01 |
| 6,000,387 A | * | 12/1999 | Lee | 125/13.01 |
| 6,283,110 B1 | * | 9/2001 | Lee | 125/13.01 |
| 6,439,218 B1 | * | 8/2002 | Hulett | 125/13.01 |
| 6,494,198 B1 | * | 12/2002 | Chen | 125/13.01 |

* cited by examiner

*Primary Examiner*—Robert A. Rose

(57) ABSTRACT

A dry and wet cutting tile saw includes a base seat in which is a disk saw blade actuated by a motor and protected by a lateral and an upper blade guards, a water sink integrated with the base seat positioned under the disk saw blade and a working station made of metallic material pivotally and adjustably secured to the top of the base seat. The working station has a pair of sliding grooves of stepped section in upper surface for selectively and slidably disposing a circle. An inverse U-shaped ruler is also disposed on the top of the working station. It is characterized that a vacuum cleaner connects to the lateral blade guard able to suck all the dirts and chips from a working piece. So that this tile saw can either conduct a dry cutting or a wet cutting of a tile without dirt contaminating the fresh air.

4 Claims, 8 Drawing Sheets

DRY AND WET CUTTING TILE SAW

BACKGROUND OF THE INVENTION

The present invention relates to tile cutting machines and more particularly to a dry and wet cutting tile saw which can be able to cut a tile with or without water in a water sink.

As we are known that a prior art tile saw has mostly a water sink disposed therein. When one cuts a tile, the dirt and chips are mostly entered into the water sink and precipitated in the water in order to prevent the dirts and/or chips from contaminating the fresh air and inhaled by the user. The shape of this water sink is probably like a drawer which may slide in or out of the base seat of the saw. Due to the obstruction of the saw blade. The water sink is very difficult to enter in place into the base seat so that both the water sink and the base seat should have a tilting angle for facilitating the engagement of the water sink within the base seat. Besides, although most of the dirts and chips are entered into the water sink, there still are some dirts and/or chips entered into the fresh air.

Further, the working station of this type of tile saw is generally made of plastic material in which the sliding guides are readily to take shape, but easy to be damaged so as to affect the precise adjustment of the angles and the distance for the circle and the ruler on it. If adopts a metallic working station, the sliding guide will not be damageable and it surface is easier to clean up than the plastic working station. Same of the producers adopt metallic working station manufactured with a punching machine. Because the sliding guides in its surface is in rectangular section, the stability of the components in these sliding guides are not reliable.

SUMMARY OF THE PRESENT INVENTION

The present invention has a main object to provide a dry and wet cutting tile saw which has a water sink in the base seat to accept the dirts and chips from the working piece and the base seat can be tilted to pour the water out of the water sink.

Another object of the present invention is to provide a dry and wet cutting tile saw which has a sucking pipe connected to an external vacuum cleaner to suck the dirts and chips out of the saw in despite of whether or not the water sink contains water.

Further object of the present invention is to provide a dry and wet cutting tile saw which has a metallic working station having sliding guides in the surface in stepped section so that the components slidably disposed in the sliding guides are rather stable.

The present invention will become more fully understood by reference to the following detailed description thereof when read in conjunction with the attached drawings.

DETAILED DESCRIPTION OF THE PREFERRED EMBODIMENT

Figure 1:
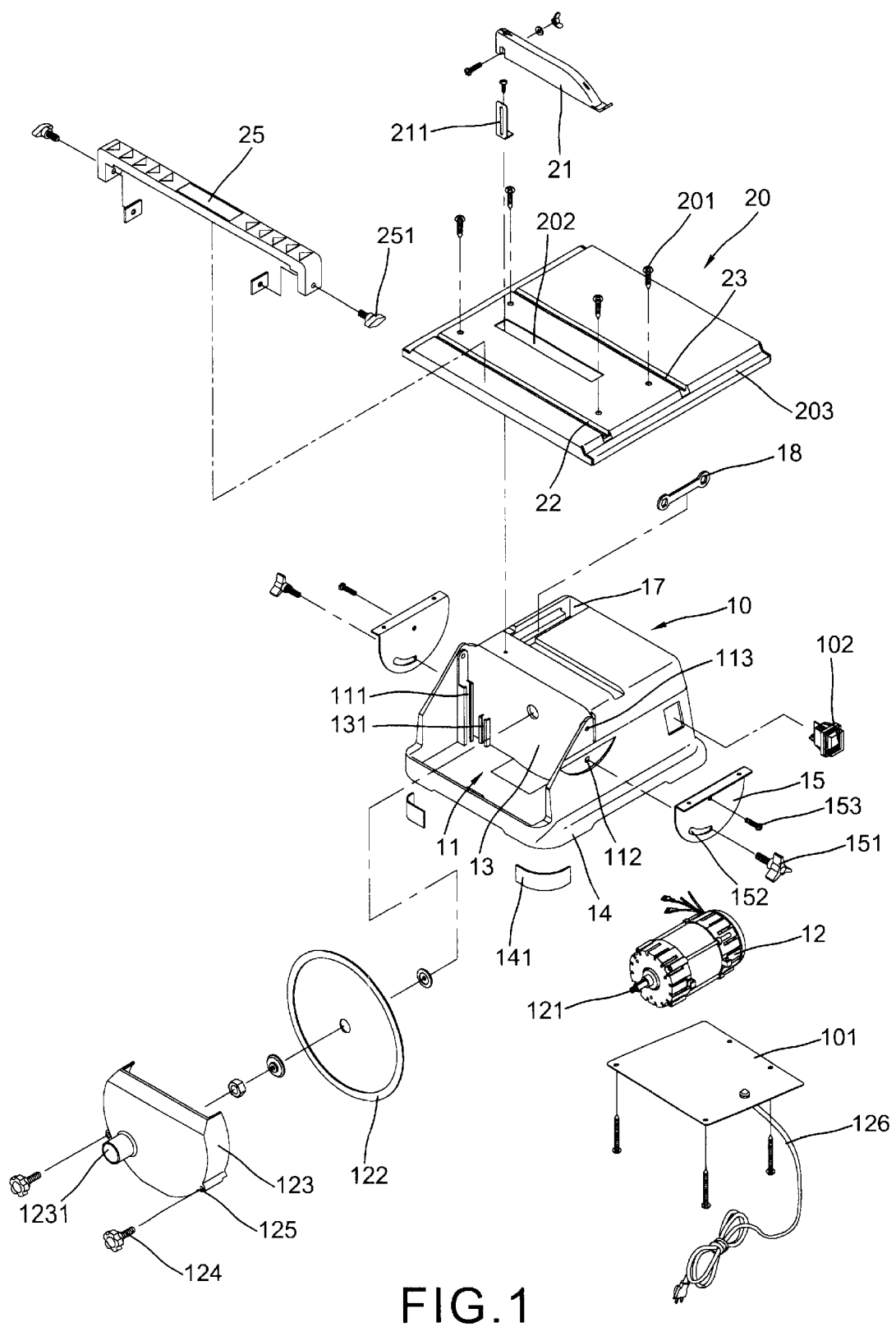
FIGS. 1 and 2 are the exploded perspective views to show the tile saw of the preferred embedment of the present invention.
Figure 2:
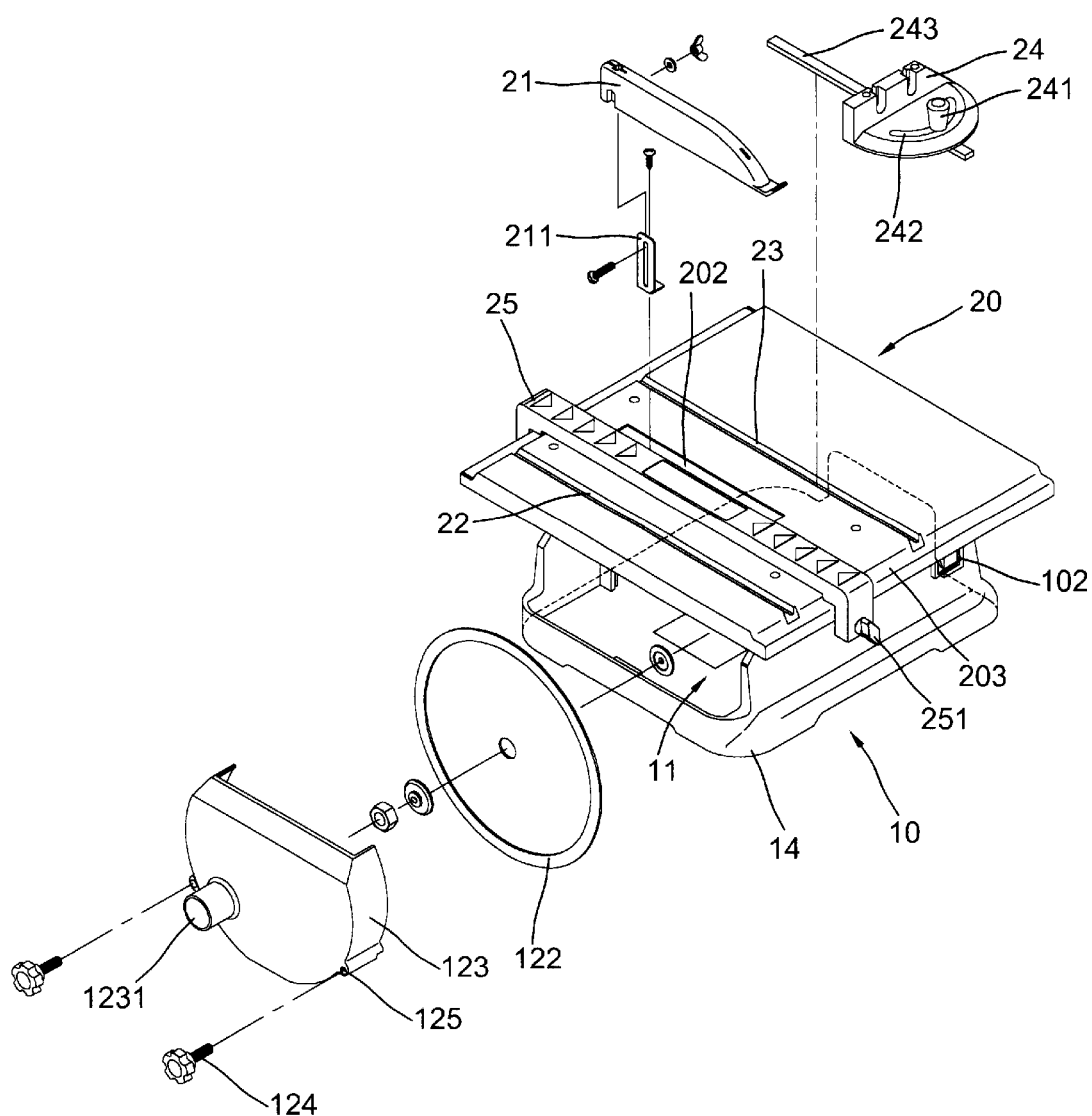

With reference to FIGS. 1 and 2 of the drawings, the dry and wet cutting tile saw of the present invention comprises principally a base seat 10 and a working station 20.

Figure 3:
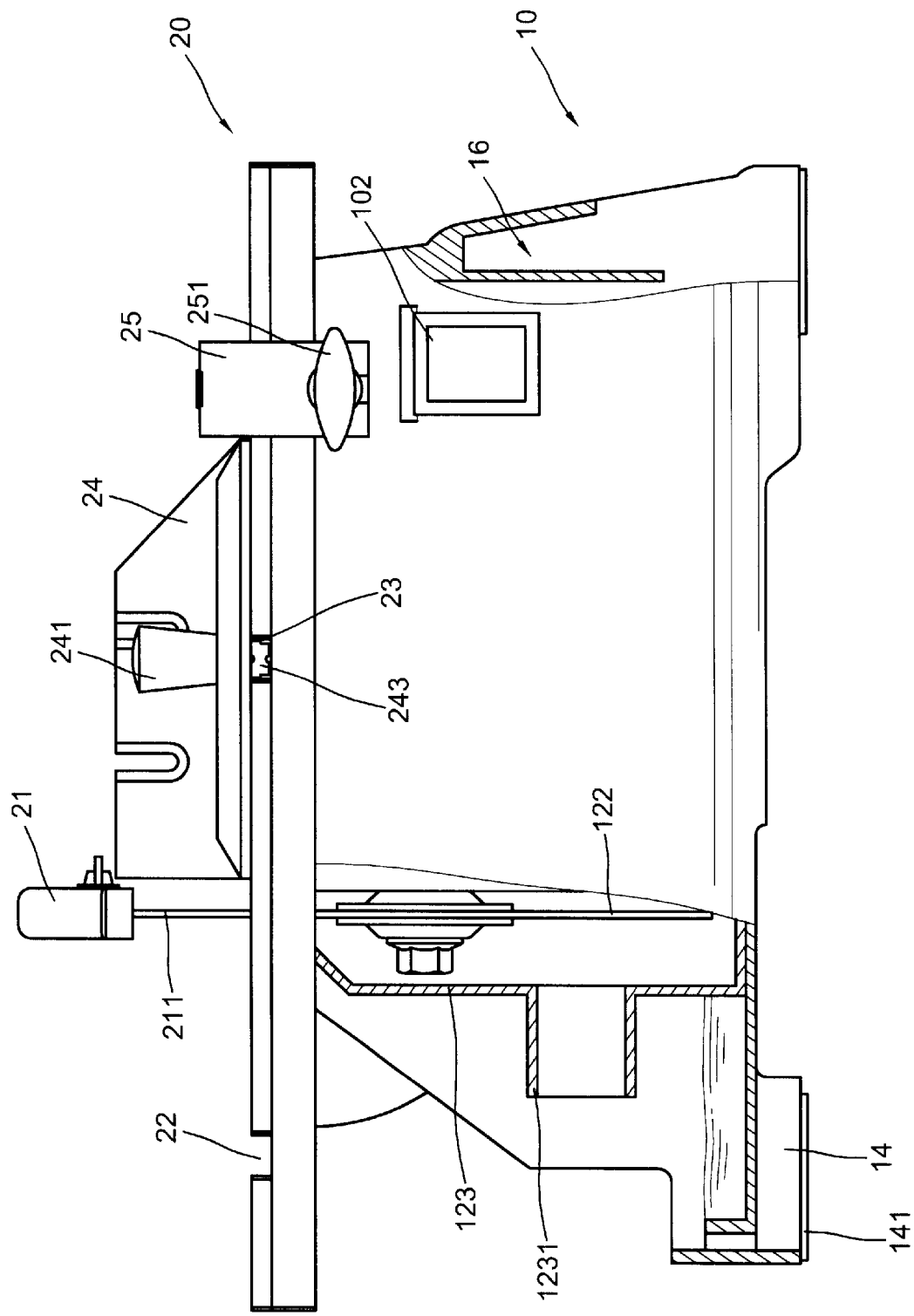
FIG. 3 is an elevational view with partially sectional view showing the position of the water sink in the base seat.
Figure 8:
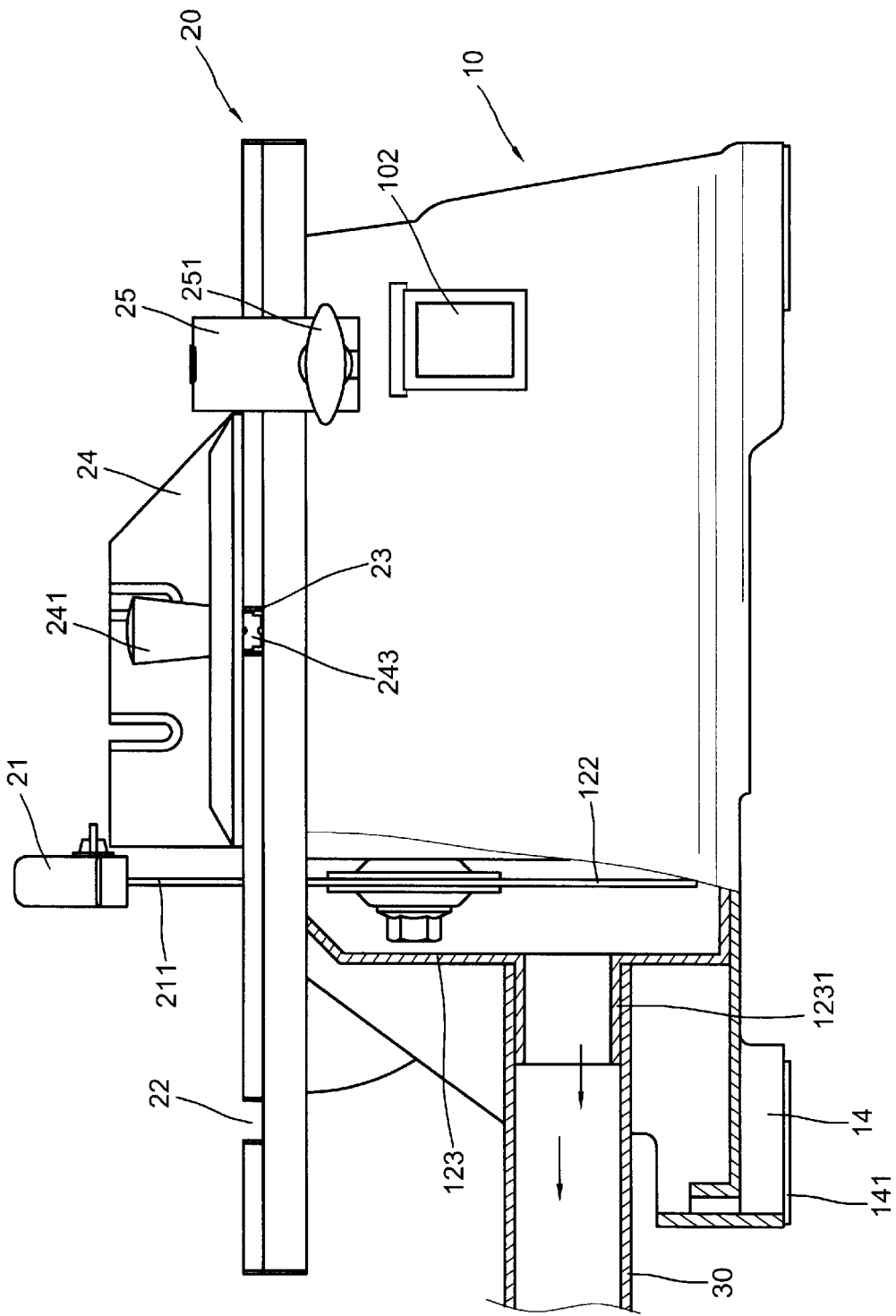
FIG. 8 is an elevational view with partially sectional view indicating that the dirts and chips from a working piece are sucked out of the tile saw through a sucking pipe into an external vacuum cleaner.

The base seat 10 has a water sink 11 abutting a motor housing and separated by a partition 13, a motor 12 disposed into the motor housing including an axis 121 secured to a disk saw blade 122 through a circular hole in a center of the partition 13, a pair of short guides 131 symmetrically formed an the lower portion of the partition 13, a lateral blade guard 123 having a pair of screw holes 125 symmetrically formed on lateral peripheries for slidably securing the blade guard 123 to the short guides 131 respectively and a sucking pipe 1231 centrally formed on outer surface communicating to a hose 30 (as shown in FIG. 8) which connects to an external vacuum cleaner (not shown), a bottom plate 101 secured to the bottom of the base seat 10 by screws including a pair of electric wires 126 respectively connected to the motor 12, a switch 102 and an external power source (not shown), four feet spacedly and respectively formed under four corners of the bottom of the base seat 10 each having a cushion 141 attached thereunder, a pair of long guides 111 symmetrically formed on inner surface of a pair of lateral walls of the water sink 11, a pair of crescent grooves symmetrically formed in the outer surface of the lateral walls of the base seat 10 each including a screw hole 112 in the center communicating within the long guides 111, a pair of screw holes 113 symmetrically formed in the lateral walls of the base seat 10 above the crescent grooves, a pair of semi-circular plates 15 each having a flange on the top including a pair of screw holes spacedly formed therein, a screw hole in an upper center beneath the flanges for securing the plates 15 to the screw holes 113 by screws 153 and an arcuate slot 152 above a lower edge for adjustably securing the plates 15 to the screw holes 112 by a pair of plate locks 151, a L-shaped groove 17 in the top of the base seat 10, a connecting bar 18 having one end pivoted to the sliding groove 17 and the other end pivoted to the bottom of the working station 20 and a finger access 16 formed in the rear end of the base seat 10 abutting the motor housing (as shown in FIG. 3).

Figure 4:
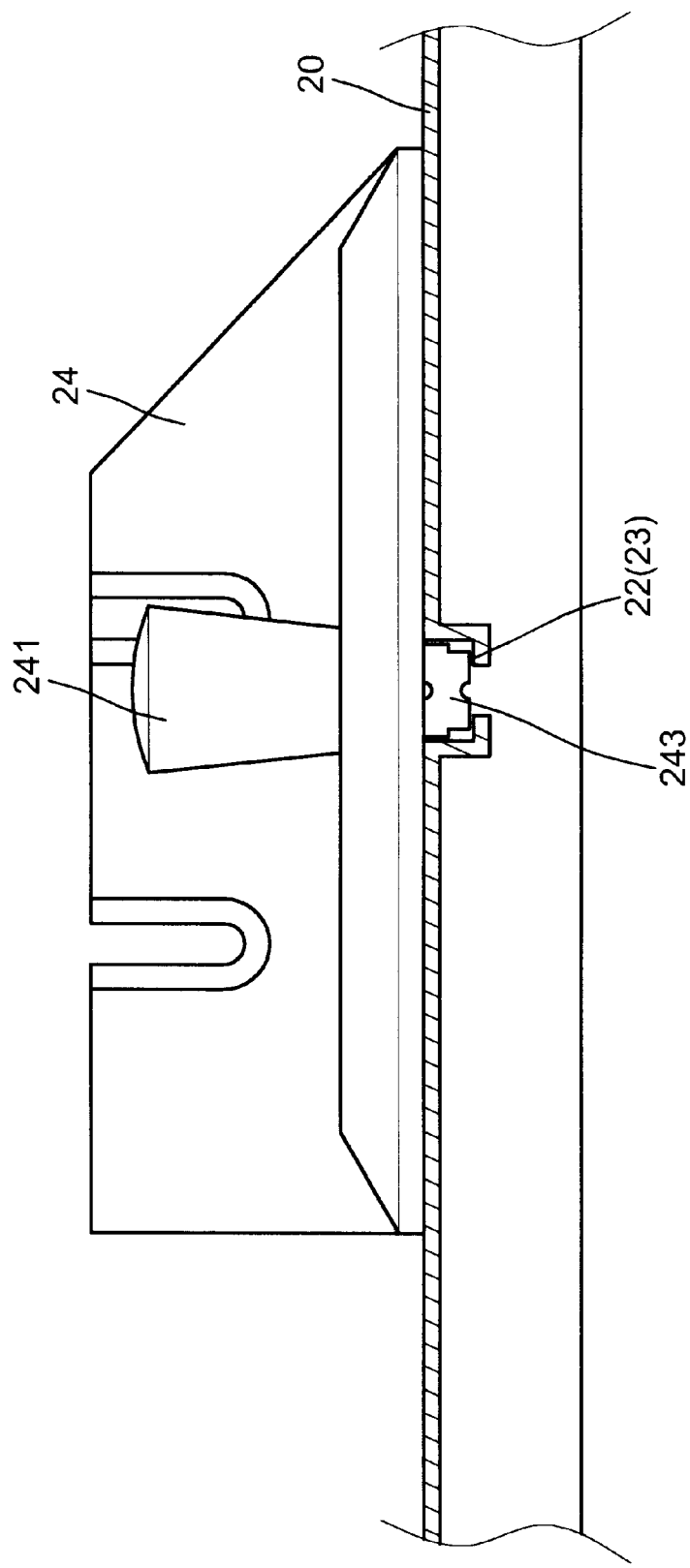
FIG. 4 is an elevational view to show the positioning bar of a circle engaged into a sliding guide of the working station.

The working station 20 is made of metallic material and positioned above the base seat 10 and has four screw holes spacedly formed in the surface for securing the working station to the flanges of the semi-circular plates 15 by screws 201 respectively, an elongate slot 202 in the surface for receiving the top of the disk saw blade 122, a L-shaped plate 211 secured to the top of the base seat 10 through one end of the elongate slot 202 for pivotally and adjustably secured one end of an upper blade guard 21 which is positioned on the top of the disk saw blade 122, a pair of sliding grooves 22 and 23 of stepped section spacedly formed in the surface parallel to the elongate slot 202 (as shown in FIG. 4) and a pair of stepped edges 203 symmetrically formed on two lateral sides perpendicular to the sliding grooves. A circle 24 having an arcuate slot 242 abutting the round edge and a positioning bar under underside slidably engaged into the sliding groove 23 and secured by an adjustable knob 241 through the arcuate slot 242. A roughly inverse U-shaped ruler 25 has a pair of stepped lateral portions engaged with the stepped edges 203 of the working station 20 and slidably secured by a pair of swivel bolts 251 (as shown in FIG. 2).

Figure 5:
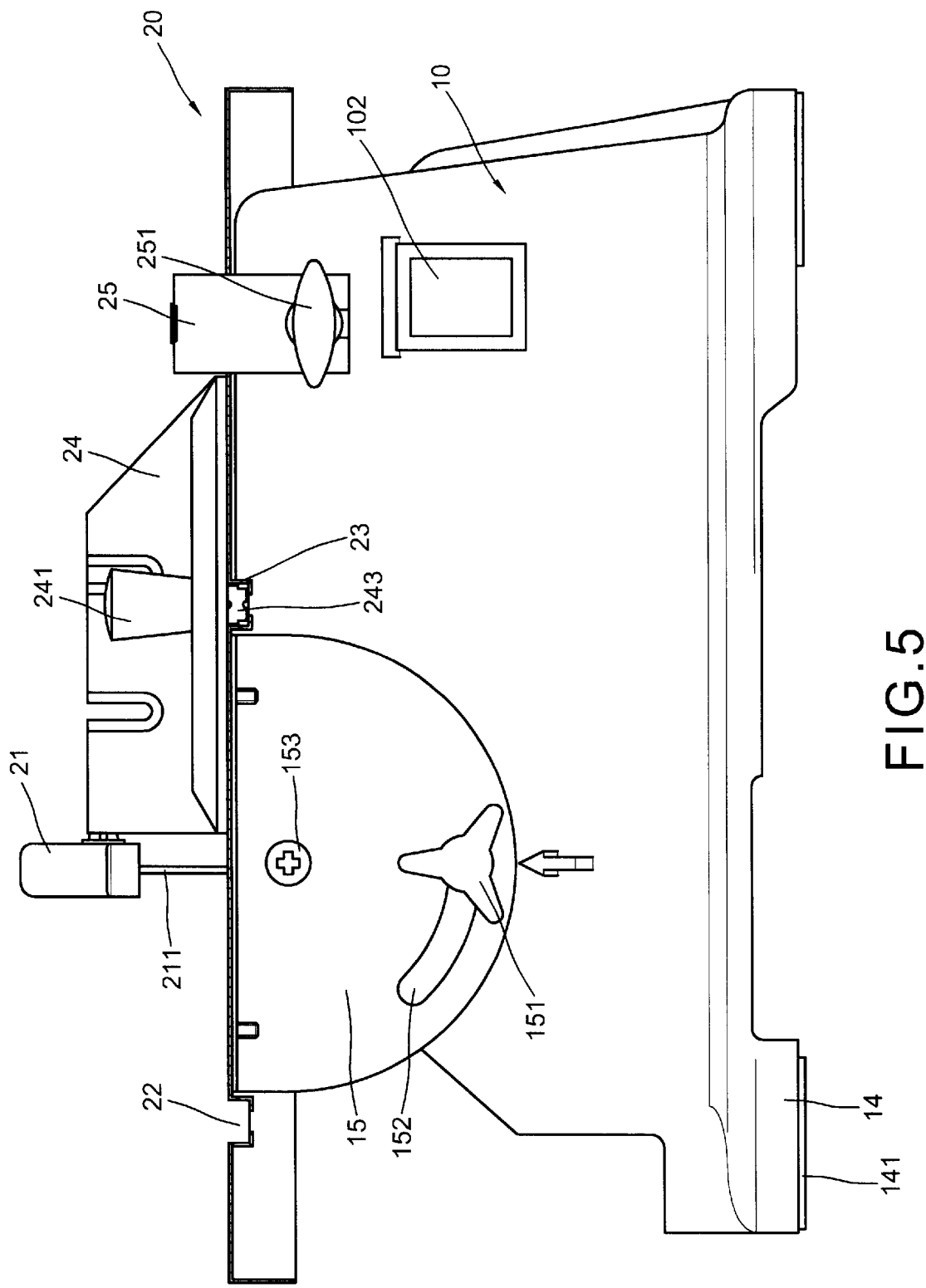
FIG. 5 is an elevational view to show the assembly of the tile saw of the present invention.
Figure 6:
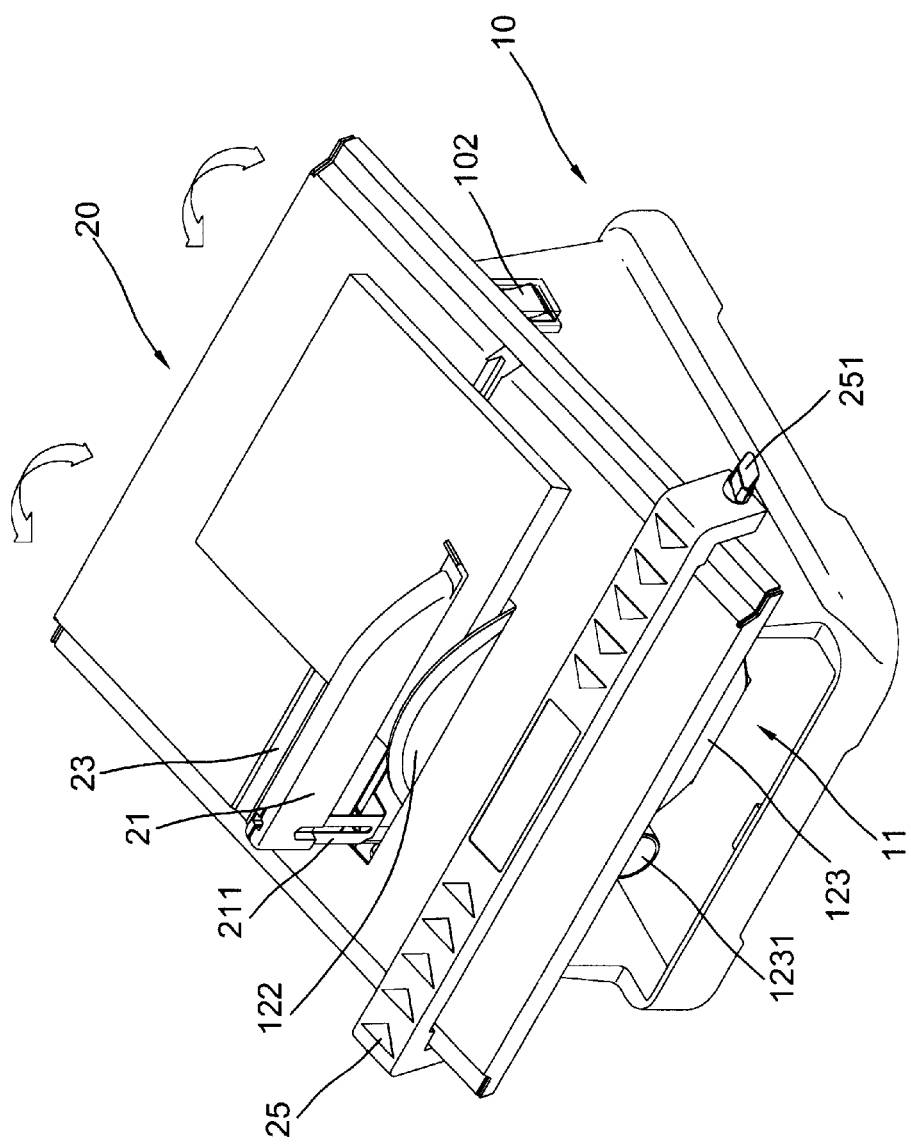
FIG. 6 is a perspective view medicating that the working station being in tilted position.

Based on the aforementioned structure, the working station 20 can be tilted by loosening the pair of plate locks 151 and pulling the right side of the working station 20 upward to let it to tilt a certain angle then fastened the plate locks 151 again (as shown in FIGS. 5 and 6).

Figure 7:
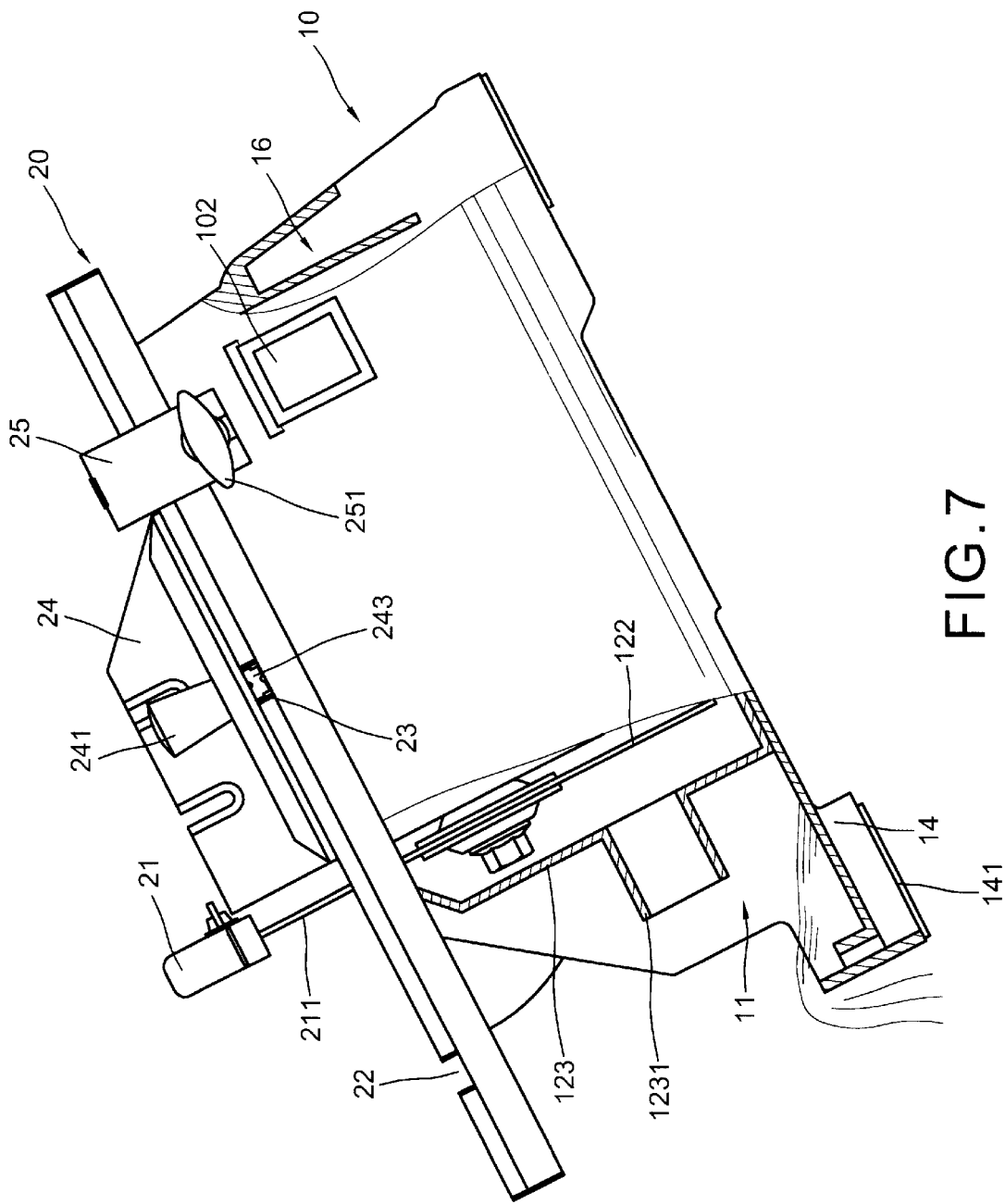
FIG. 7 is an elevational view with partially sectional view indicating that one end of the tile saw is lifted up to pour the water out of the water sink.

Referring to FIG. 7, when inserts a finger into the finger access 16 and lifts the right side of the base seat 10 upward, the dirty water will pour out of the water sink 11 without using a drawer shaped water sink as adopted by the prior art.

Referring to FIG. 8, except the water sink 11, the tile saw of the present invention has a sucking pipe 1231 and a hose 30 connected to an external vacuum cleaner (not shown) which can be able to sucking all the dirts and chips from the working piece. So that this tile saw can either perform the dry cutting or the wet cutting without any dirt contaminating the fresh air.

The tile saw of the present invention has at least the following advantages and features:

a) can solely perform dry cutting (as discussed the above), b) can solely perform wet cutting to have the dirts and chips of a working piece dropped into the water sink 11 as the conventional method without using a drawer shaped water sink as adopted by the prior art, c) it is convenient to change the dirty water in the water sink 11, and d) a metallic working station 20 and a pair of sliding grooves 22 and 23 of stepped section which not only facilitate readily cleaning the surface and the bottom of the sliding groove 22 and 23 so that the positioning bar 243 of the circle 24 could be smoothly siding in the sliding grooves 22 and 23.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A dry and wet cutting tile saw comprising:

a base seat having a water sink abutting a motor housing and separated by a partition which has a circular hole in a center, a motor disposed into said motor housing including an axis secured to a center of a disk saw blade through said circular hole, a pair of short guides symmetrically formed on a lower portion of said partition, a lateral blade guard having a pair of first screw holes symmetrically form on lateral peripheries for slidably securing said lateral blade guard to said short guides respectively and a sucking pipe centrally formed on an outer surface communicating to an external vacuum cleaner through a hose, a bottom plate secured to bottom of said base seat by screws including a pair of electric wires respectively connected to said motor, a switch and an external power source, four feet spacedly and respectively formed under four corners of the bottom of said base seat each having a cushion attached thereunder, a pair of long guides symmetrically formed on inner surface of a pair of lateral walls of said water sink, a pair of crescent grooves symmetrically formed in outer surface of said lateral walls each including a second screw hole in a center communicating to said long guides, a pair of third screw holes symmetrically formed in said lateral walls above said crescent grooves, a pair of semi-circular plates each having a flange on top including a pair of fourth screw holes spacedly formed therein, a fifth screw hole in an upper center beneath said flanges for securing said semi-circular plates to said third screw holes by screws and a first arcuate slot above a lower edge for adjustably securing said semi-circular plates to said second screw holes respectively by a pair of plate locks, a L-shaped groove in a top of said base seat, a connecting bar having one end pivoted to said L-shaped groove and other end pivoted to a bottom of a working station and a finger access formed in a rear end of said base seat abutting said motor housing;

said working station positioned above said base seat and having four sixth screw holes spacedly formed in a surface for securing said working station to said flanges of said semi-circular plates respectively by screws, an elongate slot in a surface engaging with top of said disk saw blade, a L-shaped plate secured to a top of said base seat though one end of said elongate slot for pivotally and adjustably securing one end of an upper blade guard which is positioned on the top of said disk saw blade a pair sliding grooves of stepped section spacedly formed in upper surface parallel to said elongate slot and a pair of stepped edge symmetrically formed on two lateral sides perpendicular to said sliding grooves;

a circle having a second arcuate slot abutting a round edge and a positioning bar on underside slidably engaged into one of said sliding grooves of said working station and secured by an adjustable knob through said second arcuate slot;

an inverse U-shaped ruler having a pair of stepped lateral portions engaged with said stepped edges of said working station and slidably secured by a pair of swivel bolts respectively.

2. The tile saw as recited in claim 1 wherein said working station is made of metallic material.

3. The tile saw as recited in claim 1 wherein said working station can be tilted.

4. The tile saw as recited in claim 1 wherein said base seat having a right side can be lifted up to pour dirty water in said water sink.

* * * * *